Sept. 15, 1970  F. W. HANNULA ET AL  3,529,163
RADIATION GAUGE SYSTEM FOR TUBULAR PLASTIC FILM
Filed Sept. 14, 1967  3 Sheets-Sheet 1

INVENTOR.
FRED W. HANNULA
ALFRED F. STANKO
DANIEL F. KELLEHER
BY
Robert S. Toperzer
ATTORNEY.

INVENTOR.
FRED W. HANNULA
ALFRED F. STANKO
DANIEL F. KELLEHER
BY Robert S. Toperzer
ATTORNEY.

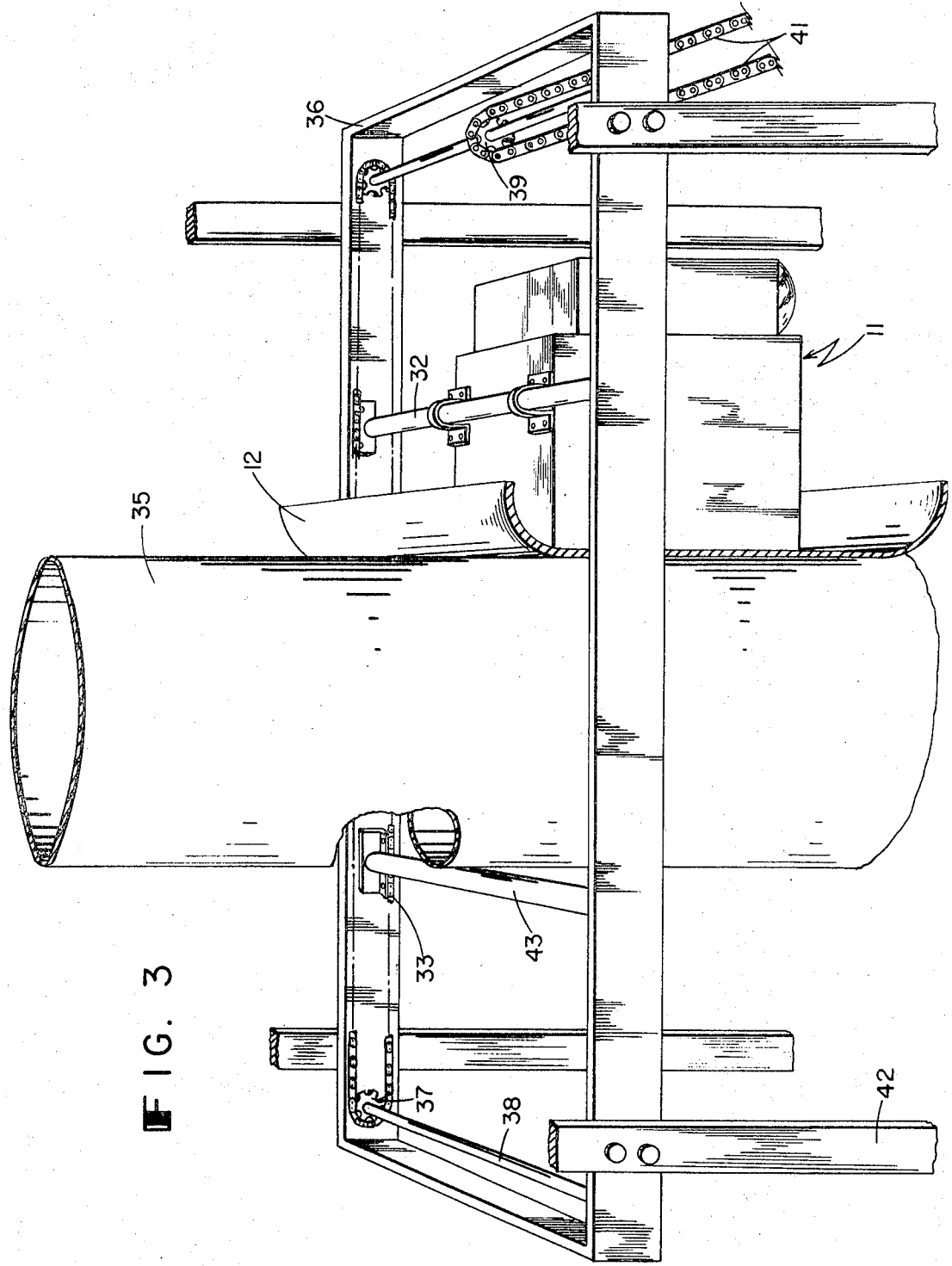

United States Patent Office 3,529,163
Patented Sept. 15, 1970

3,529,163
RADIATION GAUGE SYSTEM FOR TUBULAR PLASTIC FILM
Fred W. Hannula, Medfield, Mass., Alfred F. Stanko, West Islip, N.Y., and Daniel F. Kelleher, Framingham, Mass., assignors to Lee Corporation, a corporation of Delaware
Filed Sept. 14, 1967, Ser. No. 667,776
Int. Cl. G01n 23/20
U.S. Cl. 250—83.3       2 Claims

ABSTRACT OF THE DISCLOSURE

A backscatter type radiation guage arranged to operate at a substantially fixed distance from the surface of a plastic tube just above the front line which exists in the blown film process. The guage source and detector are contained in a single housing and the housing is carried by a frame which surrounds the tube of plastic material. More particularly, the frame is provided with a chain drive to which the housing is attached so that it can be moved horizontally into and out of an operative position. In operation, a shoe which extends out ahead of the detector housing or head is pushed against the side of the tube to establish the proper spacing to the head. The shoe is essentially rectangular in shape and is sufficiently wide so that its sides extend beyond the portion of the film in contact therewith. Also, its top and bottom are curved away from the film to further minimize friction as the plastic film passes over the surface of the shoe. To maintain the film in contact with the shoe, and to prevent axial displacement of the bubble when the shoe is placed against it, a roller is provided which pushes against the opposite side of the tube urging it toward the surface of the shoe. Thus, penetrative radiation emanating from the source in the head is beamed through an appropriately shaped aperture in the shoe and onto a relatively small rectangular patch of the film which is exposed through the aperture. The amount of radiation which is backscattered from the film, into the detector portion of the head is dependent upon the film thickness. By means of the detector, an electrical signal is developed in response to the backscattered radiation and by conventional circuitry converted into an appropriate form of indication, such as a line on a chart record.

---

This invention relates generally to sheet thickness measuring systems and more particularly it is concerned with the measurement of the thickness of plastic film which is extruded in tubular form by the blown film process.

In the blown film process of manufacturing tubular plastic film such as is used in garment bags, for example, molten thermoplastic material is extruded upwardly through an annular die, and the upper end of the plastic tube which the die forms is collapsed and continuously drown off by means of pull rolls. Also, gas pressure is produced inside the closed tube or bubble of plastic by forcing air or other gas up through the inside of the die. The pressure which the gas creates inside the bubble serves both to expand and shape the tube, while at the same time reducing its wall thickness until the frost line is reached. At this stage in the upward travel of the tube, the plastic is set so that it becomes relatively dimensionally stable. The average thickness of the set film although dependent upon the amount of pressure produced by the gas, is usually controlled by adjustment of the speed of the transport system which draws off the film in a folded condition. Circumferential thickness variations caused by nonuniformities in the extrusion process, may be distributed to some extent by continuous rotation of the die.

To measure the thickness of the plastic, a transmission type radiation gauge has been used heretofore but only at a location where the film is being transported in a folded condition. This is because of the inaccessible and generally inappropriate nature of the interior bubble environment. The disadvantage of this is that the measurements are not necessarily indicative of the thickness of the plastic in the region where it is being formed which adversely affects the degree of precision with which the thickness of the material can be controlled. Also it may be wasteful of material that has already been set upstream from the gauging station and which can no longer be dimensionally altered. Finally, the mere fact that a double thickness of the material is being measured makes it impossible to pinpoint circumferential thickness variations in any meaningful way which might permit adjustments to be made upon selected circumferential segments of the die.

Accordingly the general object of the present invention is to provide a thickness measuring system for tubular plastic film which affords a means for achieving tighter control of thickness deviations by providing accurate and reliable indications of thickness at a location near the frost line, and not just at one point but at all points on the periphery of the tube.

The novel features of the invention together with further objects and advantages will become readily apparent from the following detailed description of a preferred embodiment as shown in the accompanying drawings.

In the drawings:

FIG. 3 is a perspective view of the over-all gauge system as it appears when is is operating;

Figure 2:
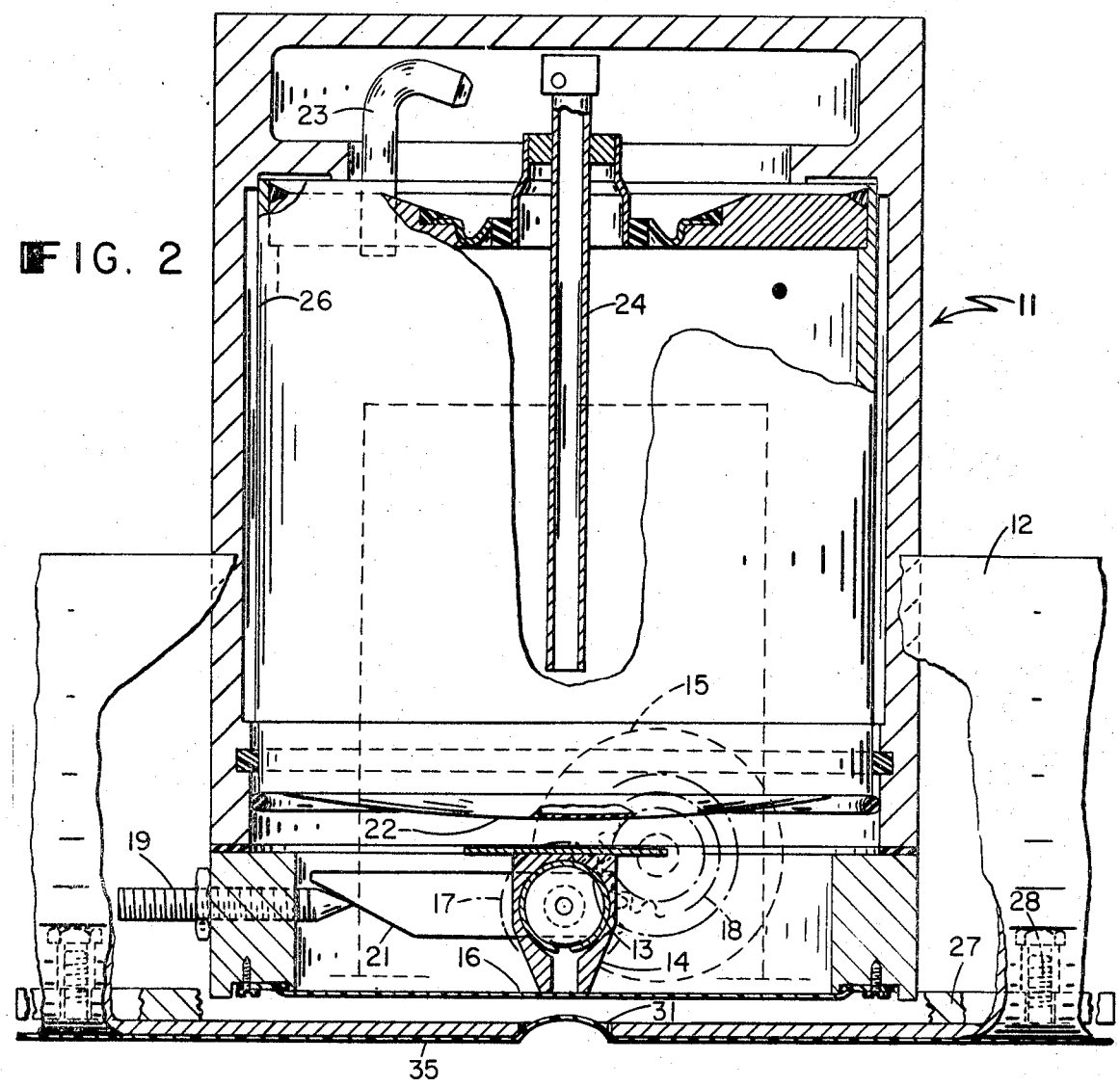
FIG. 2 is a sectional view of the gauge head.

With reference now to FIG. 2 of the drawings it will be observed that the numeral 11 denotes generally the gauge head and the numeral 12 the shoe. Although a description of the details of internal construction of the head can be found in copending application Ser. No. 624,356 filed Mar. 20, 1967 in the name of Fred W. Hannula, the basic parts of the head will be briefly mentioned for purposes of making it easier to understand the over-all system design. Thus, the source consists of an elongated capsule 13 of radioactive material, such as Krypton 85, which is retained in a source housing 14. The source housing, by virtue of its downwardly projecting internal sides, also serves as a collimator for the source which produces a narrow rectangular beam of radiation without interfering appreciably with the radiation returned from the plastic material. As shown, the opening between the sides of the source housing is facing the open end of the guage housing or head which is covered only by a thin (radiation transparent) window 16. This illustrates the operative position of the source. However, the source can be rotated by a solenoid through gears 17 and 18 so that most all of the radiation therefrom impinges upon the inner walls of the housing and is dissipated thereby. Upon return to its operative position, the proper angular position of the source is established by an adjustable stop pin 19 which limits the angular travel of an arm 21 attached to the source capsule 13.

The detector portion of the head consists of an ionization chamber which is retained inside the walls of the guage housing. A window 22 closes off the mouth of the chamber just above the source but like the source window intercepts but little radiation. The chamber is filled with Geiger gas through a filler tube 23, and the output current therefrom, evidencing the intensity of the radiation penetrating the window 22, is derived from a central electrode 24 and from an appropriate connection (not shown) to the chamber walls 26.

Figure 5:
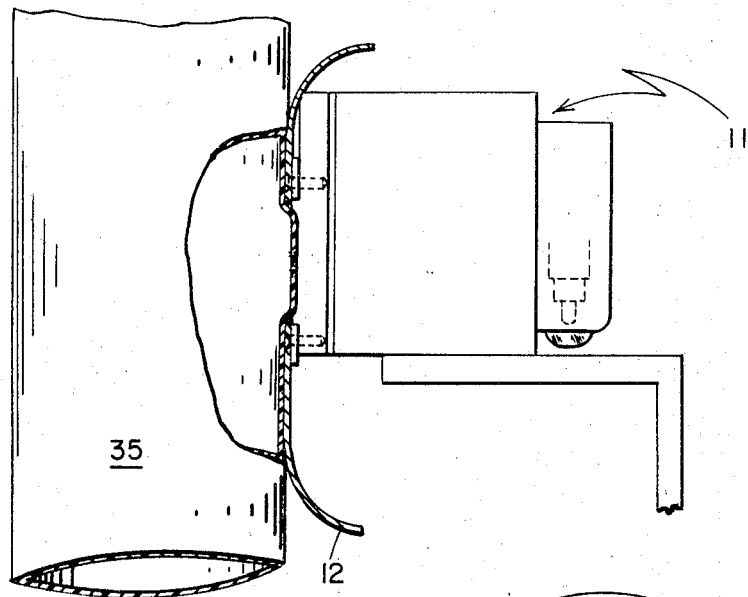
FIG. 5 is a view in elevation showing the gauge head in operative relation to the tube of film.

The shoe 12 is attached to spacer members 27 by means of bolts 28 and the spacer members in turn are bolted to the housing. As best shown in FIGS. 3 and 5, the shoe is essentially rectangular, its width being sufficiently great so that its sides extend beyond the portion of the film in contact therewith. Also its top and bottom ends are curved away from the film to minimize friction and prevent the film from catching and tearing. Further to this end, the shoe is fabricated from a light weight polished metal such as aluminum, which is coated with an anti-friction material such as Teflon. Finally, an aperture 31 is provided in the shoe opposite to the collimating channel defined by the source housing to expose a patch of the film 35 to the radiation from the source.

With reference now to FIGS. 3 and 5, it will be observed that the head 11 is suspended from a cross-bar 32. The latter, in turn, is attached to the upper run of an endless chain 33 for movement in a horizontal plane toward and away from the tube of film 35. A rectangular frame 36 is disposed about the tube and the chain runs adjacent to one of the long sides of the frame, between sprockets 37. Sprockets 37 are mounted on shafts 38 which extend between the long sides of the frame, and another driving sprocket 39 is mounted on one of the shafts 38. Driving sprockets 39 co-operate with an endless chain 41 which extends to the floor for operation by a motor (not shown) or optionally by hand. The frame 36 is supported at the proper height above the floor by legs 42 extending downwardly from the corners of the frame. Also attached to the chain 33 at a point on its lower run is a roller 43 which moves toward and away from the opposite side of the tube of film and when in its operative position, as shown, urges the tube against the shoe 12, thereby to establish the proper horizontal spacing to the head, without displacing the axis of the tube.

Figure 4:
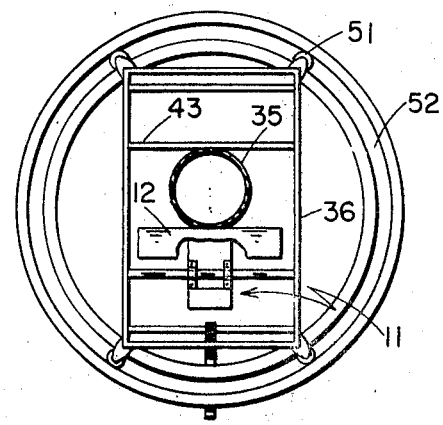
FIG. 4 is a plan view of an addition to the gauge system adapting the head for rotational movement about the periphery of the tube.

Optionally, as shown in FIG. 4, the frame 36 can be mounted for rotational movement about the tube so that the film thickness can be measured at various points about the tube's periphery. For this purpose, the corners of the frame are provided with wheels 51 which ride in a circular track 52. As shown, the track is disposed concentrically about the frame and can be supported by legs like those which support the frame 36 in FIG. 3. In this case, of course, the legs would be left off the frame.

Figure 1:
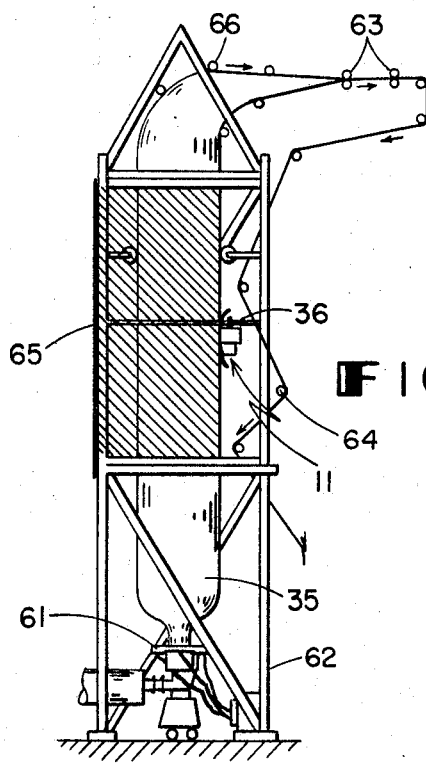
FIG. 1 is a semi-diagrammatic showing of a blown film extruding device.

For a complete understanding of the operation of the measuring system in accordance with the invention, reference will be made first to FIG. 1 which shows the essentials of a blown film extruder. Thus, molten plastic is extruded upwardly through an annular die 61 into the form of a cylindrical tube of film 35. A gas such as air is introduced through the center of the die to create pressure from within the tube or bubble, the pressure of the gas serving to expand the film into its ultimate and desired tubular shape while at the same time reducing its wall thickness. The tube is constrained to move upwardly inside a tower structure 62 under the influence of pull rolls 63 which feed the material in a folded condition to a winder (not shown) by way of a series guide rolls 64. Additionally, rolls 66 are provided to aid in collapsing of the tube into a folded condition prior to its arrival at the nip of rolls 63.

At some point part way along its travel up the tower, the frost line is reached where the plastic becomes set and hence relatively dimensionally stable under preset conditions of roll speed, gas pressure and the like. This point is determined to some extent by various operating conditions including the aforementioned and for this reason may vary somewhat from one extruder installation to another. In accordance with the present invention, the frame 36 which establishes the vertical position of the gauge head 11 is located slightly above the frost line so that its indication of thickness will accurately represent the thickness of the final product. On the opposite side of the tower structure from the gauge head there is also provided a radiation shield 65 which may take the form of a sheet of plywood. This prevents stray radiation which has passed completely through opposite wall portions of the tube from reaching unprotected areas in the vicinity of the tower. In this way, completely safe radiation levels can be maintained for any personnel who may be present in the vicinity of the tower while the guage is operating.

Figure 6:
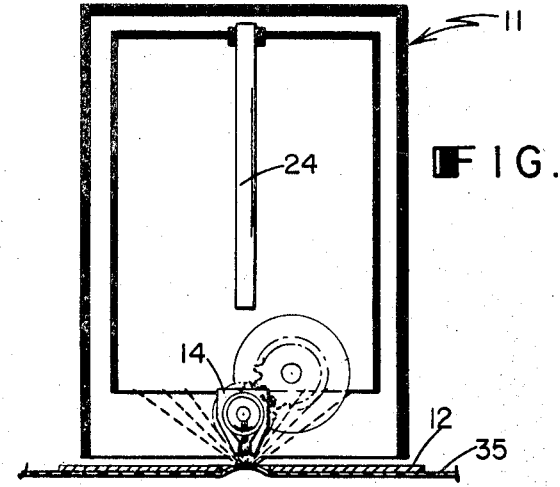
FIG. 6 is a diagrammatic view of a portion of the gauge to illustrate how it operates.

Now with respect to the operation of the gauge itself, it will be recalled that source capsule 13, as best shown in FIGS. 2 and 6 is rotatable, and that prior to the gauge being placed in operation, is angularly positioned so that the aperture in the housing faces away from the window 16 in the head. By this means, and by means of an additional safety shield (not shown) which is manually slideable over the head window, safe radiation levels are likewise maintained when the gauge is not in use. Accordingly, to operate the gauge, the shield is pulled back to expose the window, and chain drive 33 is actuated to move the gauge head and roller 43 into a position where the tube is urged against the shoe by the roller. At this time, source capsule 13 may be rotated into operating position by energization of the rotary solenoid 15.

Briefly, the way the gauge operates to measure the thickness of the material is as follows. Beta radiation is emitted by the source in the form of a narrow rectangular beam which passes substantially unimpeded through the window, and through the aperture in the shoe until it encounters the patch of film exposed through the shoe aperture. Most of the beta particles actually penetrate the film where they collide and interact with electron shells of the atoms they encounter. The thicker the material, the more collisions and the greater the likelihood that after several collisions a beta particle will leave the material at the surface it entered. In such event, the particle is said to be backscattered as shown in FIG. 6. However, the depth to which beta particles can penetrate is limited, and the deeper a particle penetrates, the less likely it is to find its way out. Thus, an upper limit is reached in terms of thickness beyond which no further gain in intensity of backscattering is obtained. By proper choice of source type, particularly as regards the source energy characteristic, this limt can be avoided and consequently the intensity of the backscattered radiation, as detected by the ionization chamber in the head, can be taken as a direct indication of thickness. Also, with an appropriate spacing of the shoe from the head, such indication can be made virtually independent of variations in the head to film spacing caused by film flutter and other uncontrollable environmental effects.

Although the invention has been described in terms of a single preferred embodiment and an elaboration thereupon, those skilled in the art will recognize that other variants within the contemplation of the invention are possible. Therefore the invention should not be deemed to be limited to the details of what has been described herein by way of illustration but rather it should be deemed to be limited only by the scope of the appended claims.

What is claimed is:

1. A thickness measuring system for tubular plastic film and the like produced by the blown film process, said system comprising a housing containing a radiation source to produce a beam of penetrative radiation with which to illuminate the film and a detector to produce an electrical signal indicative of the amount of radiation backscattered from the film, said housing having a window facing the film to permit egress and ingress of the penetrative radiation, a shoe member mounted a substantially fixed distance away from said window and having an apertured surface portion to expose a patch of film to said beam of penetrative radiation, said shoe member having an essentially rectangular shape, the width thereof being sufficiently great so that its sides extend beyond the portion of the film in contact with the shoe member, and the top and bottom portion thereof being curved away from the film so as to permit relatively free travel of the film past the surface of the shoe member in contact therewith, means to push the tube of film against said shoe member comprising a roller member mounted in a fixed position in contact with a region of film diametrically opposite from the region disposed in contact with said surface portion of the shoe member, means to move said housing and said shoe member into and out of a fixed position with said surface portion of the shoe member lightly contacting the film and with the film bellying into said aperture, said means to move said housing including a rectangular frame encompassing a section of the tube of film close to its end of origin but sufficiently removed therefrom so that the film has attained substantial dimensional stability, and a chain drive mechanism extending between opposite ends of the frame and adapted to support said housing and said shoe member for horizontal movement towards and away from the film.

2. The system according to claim 1 including a fixed circular track surounding said frame, and means on said frame co-operating with the track to support the frame for rotational movement about the tube of film.

References Cited

UNITED STATES PATENTS

| | | |
|---|---|---|
| 3,143,886 | 8/1964 | Lippke. |
| 3,132,248 | 5/1964 | Eggebraaten et al. |
| 3,270,203 | 8/1966 | Crump. |
| 3,319,067 | 5/1967 | Joffe et al. ---------- 250—105 |

ARCHIE R. BORCHELT, Primary Examiner

U.S. Cl. X.R.

250—52, 105